(12) United States Patent
Wimmer et al.

(10) Patent No.: US 8,230,598 B2
(45) Date of Patent: Jul. 31, 2012

(54) ROLLOVER WASH UNIT AND METHOD FOR MOUNTING A ROLLOVER WASH UNIT

(75) Inventors: Georg Wimmer, Affing (DE); Rüdiger Hirschmann, Augsburg (DE); Henning Rohne, Fischach (DE)

(73) Assignee: Washtech Holding GmbH, Augsburg (DE)

( * ) Notice: Subject to any disclaimer, the term of this patent is extended or adjusted under 35 U.S.C. 154(b) by 580 days.

(21) Appl. No.: 12/440,563

(22) PCT Filed: Aug. 2, 2007

(86) PCT No.: PCT/EP2007/058012
§ 371 (c)(1),
(2), (4) Date: Apr. 14, 2009

(87) PCT Pub. No.: WO2008/031674
PCT Pub. Date: Mar. 20, 2008

(65) Prior Publication Data
US 2010/0037406 A1    Feb. 18, 2010

(30) Foreign Application Priority Data

Sep. 11, 2006  (DE) .................. 10 2006 043 199

(51) Int. Cl.
*E04B 1/00*    (2006.01)

(52) U.S. Cl. ............... 29/897.31; 29/897.3; 29/897.312; 15/53.3

(58) Field of Classification Search .............. 29/897.3, 29/897.31, 897.312, 897.33, 464, 466; 15/DIG. 2, 15/53.3
See application file for complete search history.

(56) References Cited

FOREIGN PATENT DOCUMENTS

| DE | 102 08 927 A1 | 9/2003 |
|----|---------------|--------|
| DE | 102004053357 A1 | 5/2006 |
| FR | 2876126 A3 | 4/2006 |

OTHER PUBLICATIONS

International Search Report published Mar. 20, 2008 for PCT/EP2007/058012.
International Preliminary Report on Patentability published Apr. 7, 2009 for PCT/EP2007/058012 filed Aug. 2, 2007 (Eng. translation).
Written Opinion published Apr. 3, 2009 for PCT/EP2007/058012 filed Aug. 2, 2007 (Eng. translation).

*Primary Examiner* — David Bryant
*Assistant Examiner* — Christopher Besler
(74) *Attorney, Agent, or Firm* — Martin Fleit; Paul D. Bianco; Fleit Gibbons Gutman Bongini & Bianco PL

(57) ABSTRACT

A rollover wash unit for a vehicle wash system that allows an efficient and space-saving transport and a method for mounting a rollover wash unit that allows an efficient, simple and fast mounting of the rollover wash unit in situ.

9 Claims, 7 Drawing Sheets

ROLLOVER WASH UNIT AND METHOD FOR MOUNTING A ROLLOVER WASH UNIT

FIELD OF THE INVENTION

The invention pertains to a rollover wash unit for a vehicle wash system, as well as to a method for assembling a rollover wash unit.

BACKGROUND OF THE INVENTION

Manufacturers of vehicle wash systems usually deliver rollover wash units for vehicle wash systems to the operators of the vehicle wash systems in the completely assembled state. This makes it possible to start up the vehicle wash system at the intended location as quickly as possible. However, this advantage of the quickest possible start-up of the rollover wash unit at the operator of the vehicle wash system is associated with the disadvantage that rollover wash units can only be transported with special trucks due to the considerable width, height, and weight of the rollover wash unit. Furthermore, the space between the lateral parts and the portal traverse remains largely unused during the transport due to the portal shape of the rollover wash unit. In larger rollover wash units, e.g., for station wagons, it also has to be taken into account that the assembled rollover wash unit exceeds the permissible dimensions, particularly the permissible height, for road or rail transport. Consequently, the traveling legs of the lateral parts of the rollover wash unit are removed prior to the transport, wherein their in situ reinstallation on the vehicle wash system is associated with significant expenditures.

The size of a completely assembled rollover wash unit frequently also creates problems during the assembly in washing bays because the entrance doors of the washing bays frequently are not sufficiently large for a completely assembled rollover wash unit. Therefore, the traveling legs of the rollover wash units and parts of the sidewalls need to be removed prior to the assembly in the washing bay in order to even move the rollover wash unit into the washing bay.

Since completely assembled rollover wash units not only have large dimensions, but are also very heavy, special heavy-duty cranes are required for unloading and assembling the rollover wash units in situ, wherein these cranes also require much space and a correspondingly paved surface in order to unload and assemble the rollover wash unit in situ.

For example, DE 10 2004 053 357 A1 discloses a rollover wash unit of this type in the form of a device for washing the exterior of motor vehicles. In this device, a machine frame in the form of a car trailer is described, on which at least one mast of the unit is arranged such that it can be pivoted between an essentially horizontal and an essentially vertical position. The distance of the base points of the masts from one another can be varied on both masts to such an extent that the clear width between the masts in the extended state is greater than the actual width of the vehicle in question, e.g., a truck, while the overall width of the vehicle wash system in the contracted state is not greater than the permissible width of a car trailer that can be used on public roads without a special permit. In order to vary the distance between the masts, it is proposed that the arc that connects the masts be collapsible in its center. The arc itself is rotatably arranged on the upper ends of the columns that, in turn, can be turned relative to the lower sections of the masts by 180° in order to realize a space-saving transport. This device has the disadvantage that several tilting processes in different directions are respectively required for the assembly and the disassembly. The stability of the entire construction is reduced due to the two-part masts and the two-part arc. The numerous hinges required for the manufacture and the assembly are also expensive and complicated.

SUMMARY OF THE INVENTION

The present invention therefore is based on the objective of making available a rollover wash unit and a method for assembling a rollover wash unit that eliminate the above-described disadvantages and allow an efficient and space-saving transport, as well as an efficient, simple and fast assembly of the rollover wash unit in situ.

This objective is attained with a rollover wash unit for a vehicle wash system with the characteristics of Claim 1 and a method for assembling a rollover wash unit with the characteristics of Claim 8. Advantageous embodiments and practical additional refinements of the invention are disclosed in the dependent claims.

The initially cited rollover wash unit is characterized in that the traverse and the lateral parts are rotatably connected to one another by means of at least one articulated connection with a rotational axis that essentially extends perpendicular to the lateral parts and along the traverse in order to assemble the rollover wash unit. Due to this articulated connection that may also be produced in situ prior to the assembly of the rollover wash unit, the traverse and the lateral parts can be transported separately prior to the assembly and moved into a vehicle wash bay individually. Consequently, special trucks and cranes are no longer absolutely imperative for transporting, as well as for unloading and assembling, but naturally may still be used. If the traverse and the lateral parts are then correspondingly positioned and aligned relative to one another at the installation site and the articulated connection with a rotational axis that essentially extends perpendicular to the lateral parts and along the traverse is subsequently produced such that the lateral parts can be turned relative to the traverse, only a forklift is required for unloading the components from the delivery truck. This forklift can also lift the traverse from the assembly position while the lateral parts are moved into the final position required for the final assembly of the rollover wash unit. The assembly can then be easily and quickly completed by subsequently connecting the traverse and the lateral parts such that they can no longer turn relative to one another. The invention makes it possible to save or use transportation space more efficiently and to simultaneously realize a fast and simple assembly of the rollover wash unit, namely also in small washing bays or a similarly confined space.

The articulated connection is preferably realized in the form of a hinge. In one embodiment that is advantageous with respect to the technical assembly, it is merely required to insert hinge pins or shafts through the hinge bushings and to subsequently screw together the hinge pins or shafts in order to connect the lateral parts and the traverse. In another advantageous embodiment of the articulated connection, pivot pins are arranged on the traverse or the lateral parts and engage into corresponding pin receptacles on the other part.

In order to rigidly connect the traverse to the lateral parts, a locking device is provided on the traverse and the lateral parts in another advantageous embodiment. In this fashion the connection is prevented from quickly and unintentionally loosening in the completely assembled state of the rollover wash unit. The locking device may feature a quick-release closure, for example, in the form of a quarter-turn fastener or a snap-in locking device.

If the traveling legs of the rollover wash unit feature rolling means, the still rotatable rollover wash unit that is connected by means of the articulated connection can be transferred from the assembly position into the final position in a particularly simple fashion.

BRIEF DESCRIPTION OF THE DRAWINGS

Other special features and advantages of the invention are described below with reference to one preferred exemplary embodiment that is illustrated in the drawings. In these drawings.

DETAILED DESCRIPTION OF THE INVENTION

Figure 1:
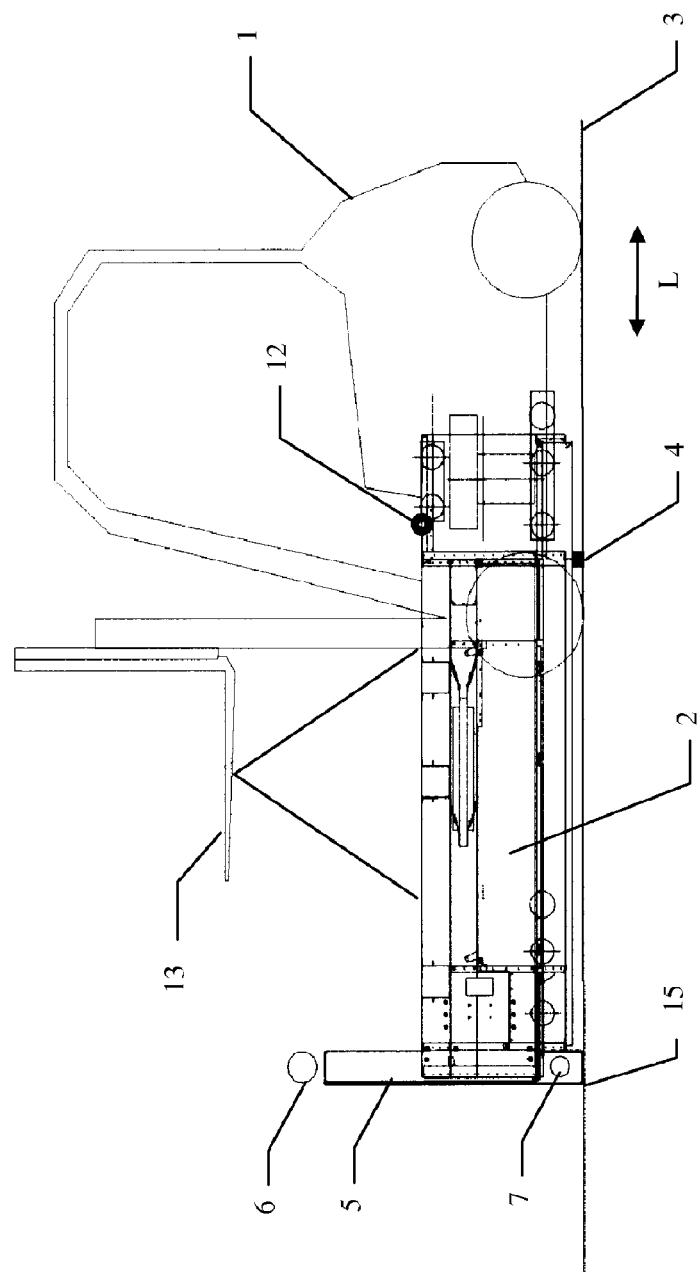
FIG. 1 shows a schematic side view of the lateral parts of a rollover wash unit in an assembly position.
Figure 2:
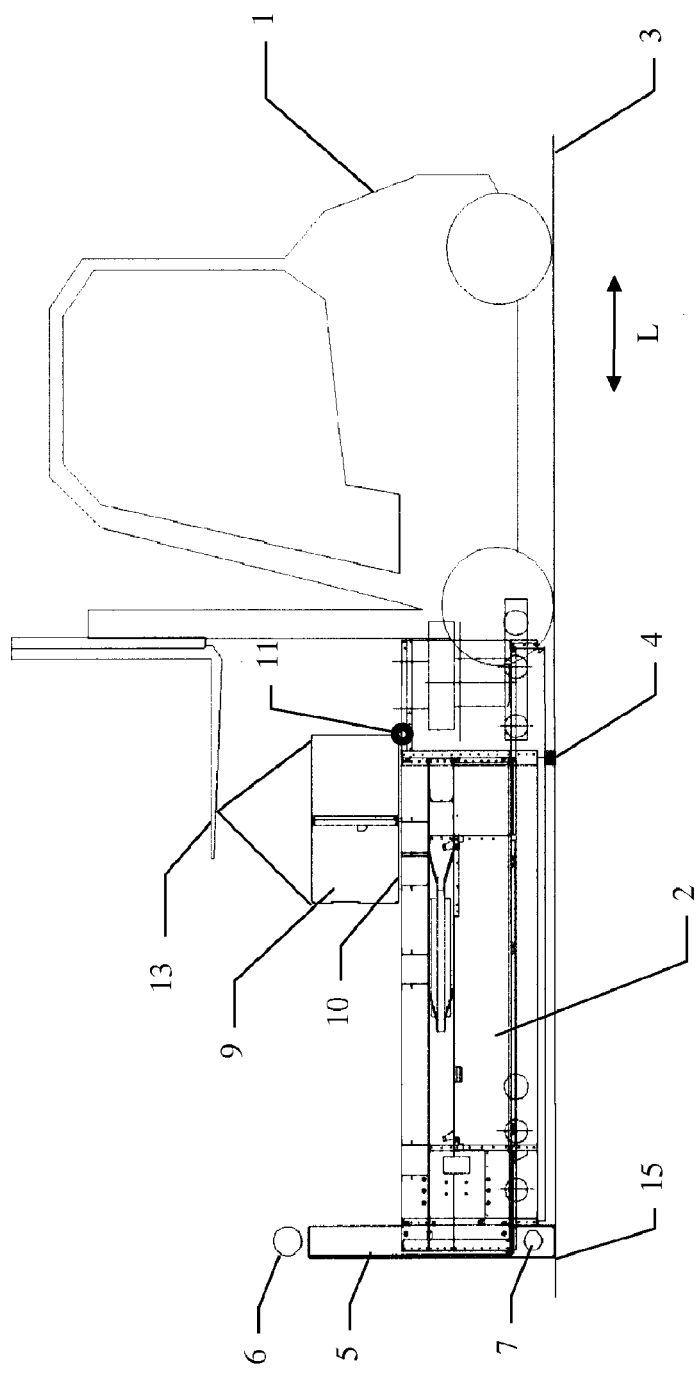
FIG. 2 shows the side view according to FIG. 1 as the traverse is lifted onto the lateral parts.
Figure 3:
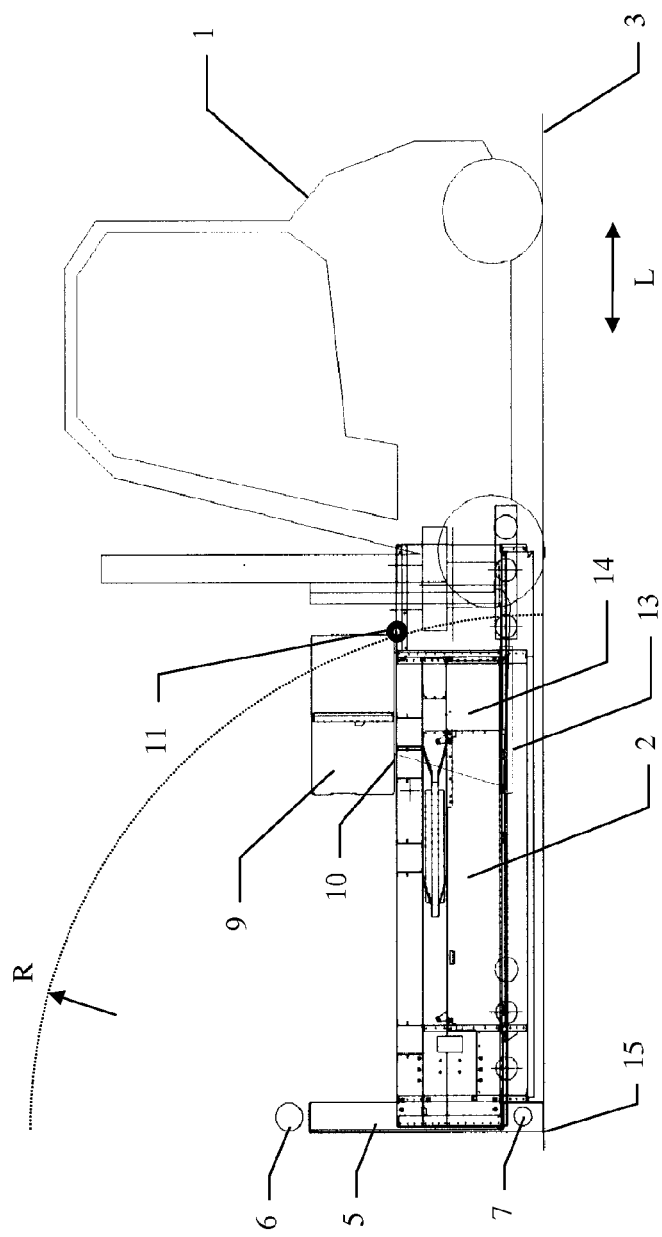
FIG. 3 shows the side view according to FIG. 1 wherein the lateral parts and the traverse are rotatably connected to one another before the traverse is lifted.
Figure 4:
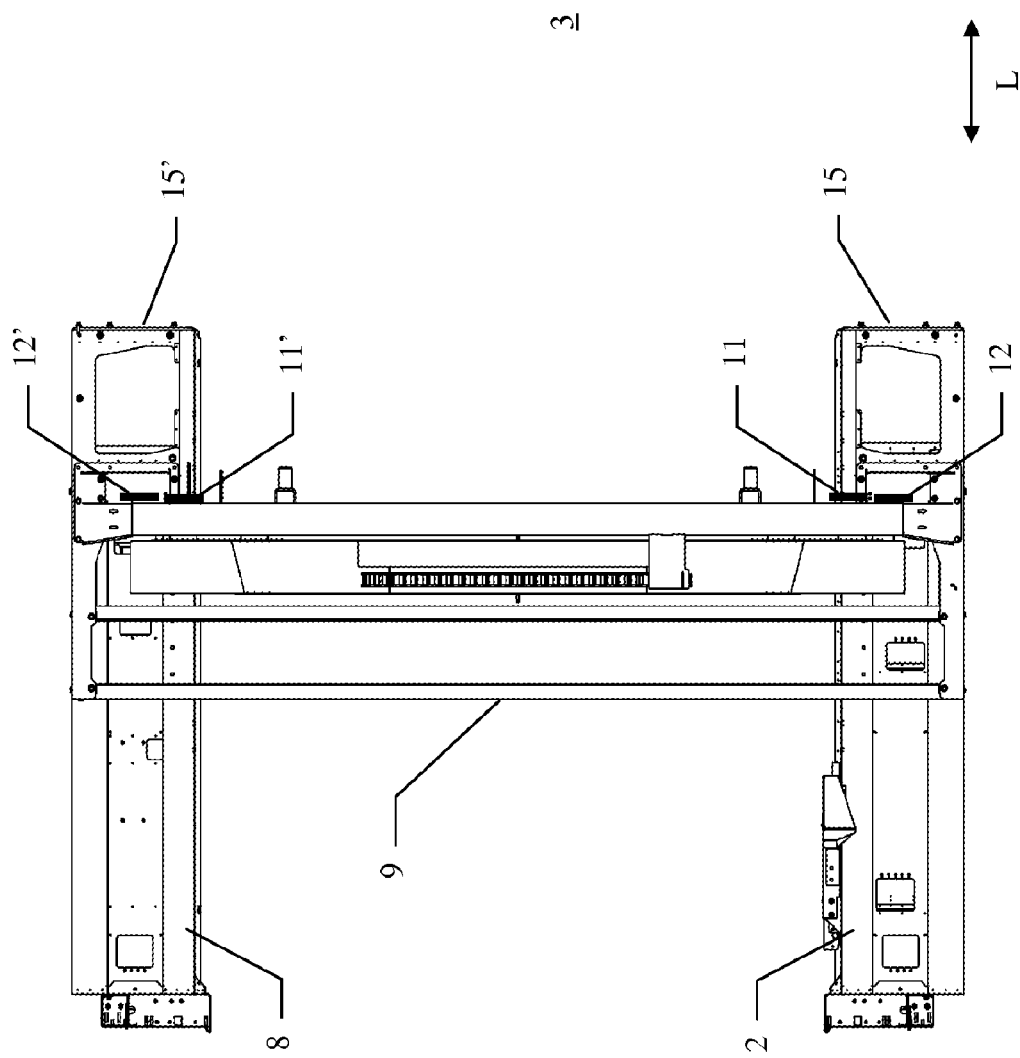
FIG. 4 shows a schematic top view of the rollover wash unit according to FIG. 3.

FIGS. 1-7 show the installation of a rollover wash unit in a washing bay from the delivery of the individual components up to the completed assembly of rollover wash unit. In FIG. 1, a conventional forklift 1 transports a left lateral element 2 of a rollover wash unit into the washing bay and places this lateral element onto a support beam 4 on the washing bay floor 3. The lateral element 2 consequently is in a position in which it is turned by 90° referred to its final position (see FIG. 7). A traveling leg 5 is rigidly arranged on the lateral element 2, namely at the left end in FIG. 1, and features rollers 6, 7 that serve for displacing the rollover wash unit in the longitudinal or washing direction L within a rail arrangement that is not illustrated in the figures in its completely assembled state. The left lateral element 2 is positioned on the floor 3 in such a way that the rollers 6, 7 engage with a left rail of the rail arrangement as easily as possible during the assembly of the rollover wash unit. After the left lateral element 2 is placed on the floor 3, a right lateral element 8 that is only illustrated in FIG. 4 is accordingly placed on the floor 3 and the support beam 4, and aligned parallel to the left lateral element 2 in the longitudinal direction L. The distance of the right lateral element 8 from the left lateral element 2 is chosen such that the right lateral element 8 can also engage into a right rail of the rail arrangement that extends parallel to the left rail once the rollover wash unit is installed and completely assembled. Washing brushes and other treatment modules are not attached to the rollover wash unit until it is completely assembled and in the final position so that they will not be damaged.

Once the two lateral elements 2, 8 are aligned, a traverse 9 is placed onto the lateral parts 2 and 8 with an underside 10, wherein the traverse 9 is essentially aligned perpendicular to the longitudinal direction L and the longitudinal sides of the lateral elements 2, 8 as clearly shown in FIGS. 2 and 4. In this case, the underside 10 is the side of the traverse that points to the floor 3 in the final position of the rollover wash unit shown in FIG. 7. It also must be observed that hinge bushings 11, 11' that are arranged on the lower right edge of the traverse 9 in FIG. 2 and open on both sides are aligned with corresponding hinge bushings 12, 12' on the left and on the right lateral element 2, 8.

In order to optimally align the lateral parts 2, 8 and the traverse 9 during the assembly, aligning elements in the form of pins with corresponding recesses are provided on the underside 10 of the traverse 9 and the lateral parts 2, 8 contacting the underside 10, and these are engaged with each other when the traverse 9 is placed onto the lateral parts 2, 8. The aligning elements also prevent the traverse 9 from laterally shifting in the assembly position.

In order to produce an articulated connection that serves for rotatably connecting the lateral parts 2, 8 to the traverse 9, the hinge bushings 11, 12 are subsequently connected in a rotatable fashion by means of one respective hinge pin for the left and the right lateral elements 2, 8, wherein the hinge pins are secured from falling out with screw nuts at their ends that protrude beyond the hinge bushings. This does not impair the rotatability of the articulated hinge connection.

In an alternative embodiment that is not illustrated in the drawings, the articulated connection features an open hinge bushing that is rigidly arranged on the right edge of the underside 10 of the traverse 9 in FIG. 2. The hinge bushing is formed by a pipe that extends over the entire length of the traverse 9 between the lateral parts 2, 8. Subsequently, a hinge pin is inserted into the pipe and fixed on the lateral parts 2 and 8 at its two ends that protrude beyond the pipe. In this embodiment, an articulated connection is sufficient to turn the lateral parts 2, 8 relative to the traverse 9. Instead of using one continuous pipe, it would also be possible to attach several short pipe sections over the length of the traverse 9 in this embodiment and to insert the hinge pin into these pipe sections.

In order to produce an articulated connection that serves for rotatably connecting the lateral parts 2, 8 to the traverse 9, the hinge bushings 11, 12 are subsequently connected in a rotatable fashion by means of one respective hinge pin for the left and the right lateral element 2, 8, wherein the hinge pins are secured from falling out with screw nuts at their ends that protrude beyond the hinge bushings. This does not impair the rotatability of the articulated hinge connection.

After the articulated connection between the traverse 9 and the lateral parts 2, 8 has been produced, the forklift 1 moves underneath the traverse 9 with its lifting fork 13 and a spacer element 14 arranged thereon as shown in FIG. 3. Subsequently, the lifting fork 13 with the traverse 9 lying thereon is carefully lifted such that the lateral parts 2, 8 rotatably connected thereto are tilted from the assembly position illustrated in FIGS. 1-4 into the final position shown in FIG. 7.

Figure 5:
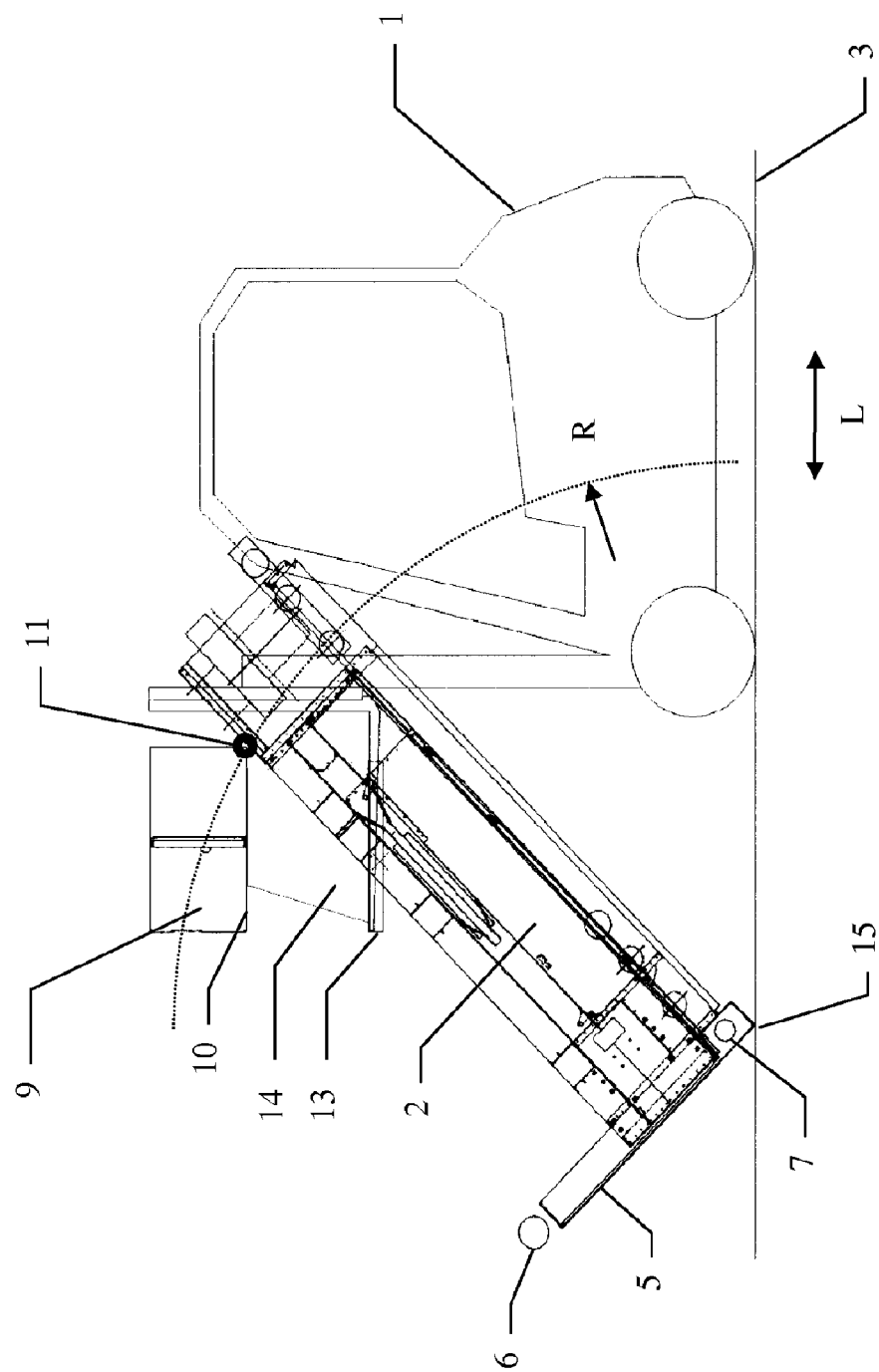
FIG. 5 shows the side view of the rollover wash unit according to FIG. 3 while the traverse is lifted.
Figure 6:
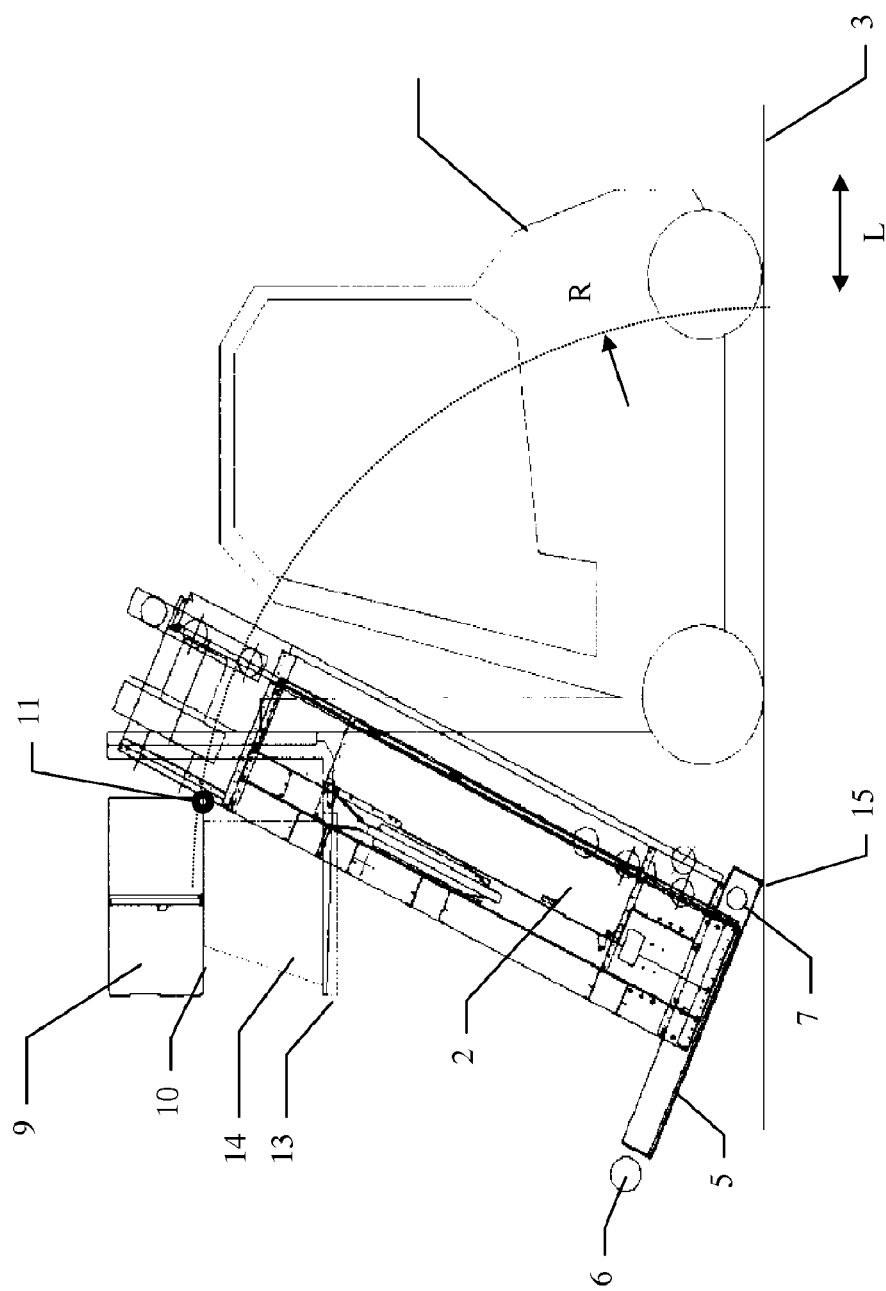
FIG. 6 shows the side view of the rollover wash unit according to FIG. 3 shortly before the traverse being lifted reaches a final position.

FIGS. 5 and 6 show intermediate positions of the traverse 9 during the lifting thereof, wherein the lateral parts 2, 8 carry out a rotational movement about a lower tipping edge 15, 15' of the traveling legs 5, 5' of the lateral parts 2, 8 in FIGS. 5 and 6 that is supported on the floor 3, and wherein the turning radius R of the articulated hinge connection 11, 12 about the tipping edges 15, 15' is schematically indicated in the drawings. In order to carry out a rotational movement, the forklift 1 needs to slowly move toward the left in the longitudinal direction L in the embodiment shown, namely in accordance with the rotational movement during the lifting of the lifting fork 13, until the traverse 9 and the lateral parts 2, 8 have reached the final position shown in FIG. 7.

In an embodiment of the invention that is not illustrated in the drawings, rolling means in the form of rollers are attached to the tipping edges 15, 15' such that the forklift 1 does not have to drive forward while the traverse 9 is lifted, but merely needs to lift up the traverse 9 with its lifting fork 13. The traveling legs 5, 5' of the lateral elements 2, 9 [sic; 2, 8] then roll from the distant position referred to the forklift shown in FIG. 3 toward the forklift 1 on the rollers of the tipping edges 15, 15' until the lateral parts 2, 8 arrive in the final position shown in FIG. 7. It would also be possible to use suitable rolling means other than rollers such as, for example, wheels, cylinders, etc.

Figure 7:
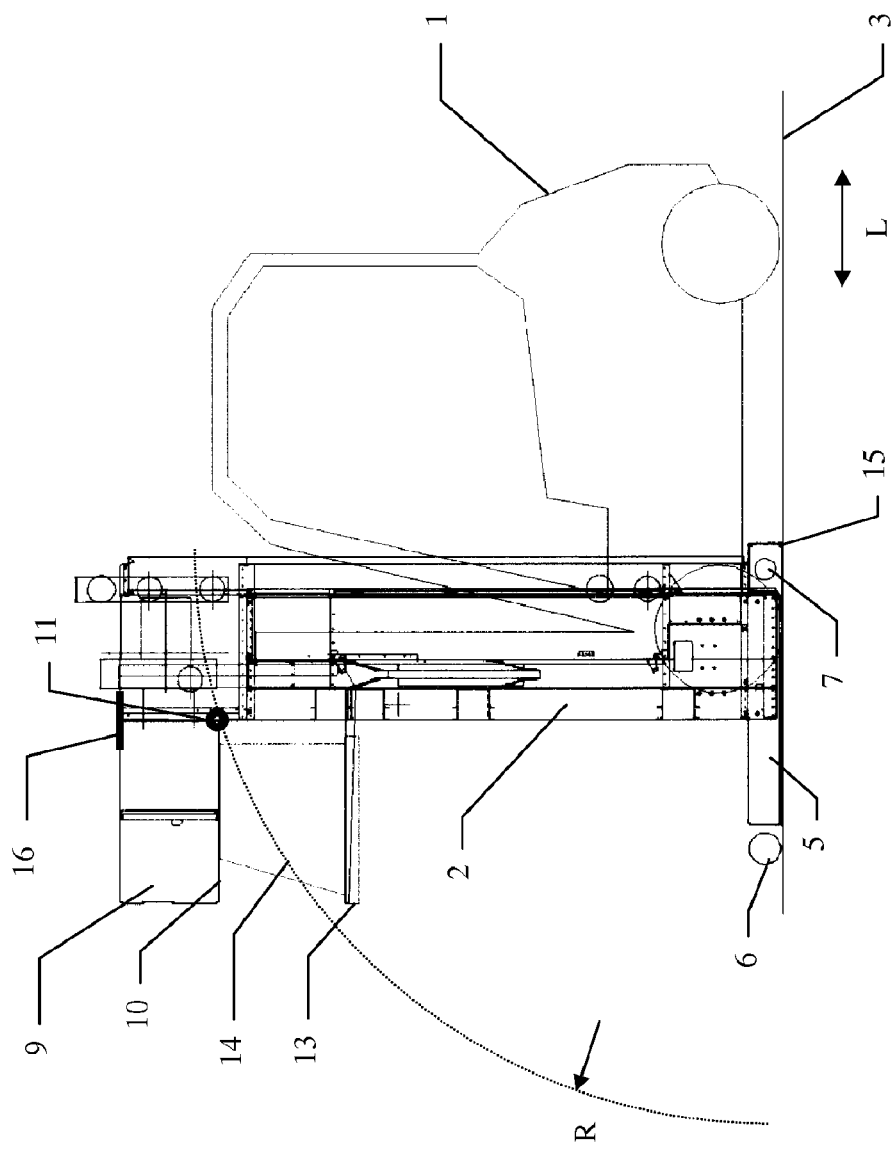
FIG. 7 shows a schematic side view of the rollover wash unit according to FIG. 1 in the final position.

In order to finish the assembly of the rollover wash unit, the traverse 9 is rigidly connected to the lateral parts 2, 8 in the final position of the rollover wash unit shown in FIG. 7 in order to prevent turning of the traverse 9 relative to the lateral parts 2, 10 [sic; 2, 8]. For this purpose, a locking device 16 is provided on the upper edges of the traverse 9 in FIG. 7 and on the lateral parts 2, 8 in order to rigidly and quickly fix the traverse 9 on the lateral parts 2, 8. In this embodiment, the locking device consists of hooks that are rotatably arranged on the traverse 9 and engage into corresponding recesses on the lateral parts 2, 8. The hooks are also provided with a snap-in projection that engages into corresponding snap-in grooves of the recesses to thus prevent the locking device from unintentionally loosening. Alternatively, the traverse 9 and the lateral parts 2, 8 may also be rigidly connected to one another by means of quarter-turn fasteners, screw connections or other suitable connecting elements.

In order to achieve an optimal alignment between the lateral parts 2, 8 and the traverse 9 in the final position shown in FIG. 7, not-shown aligning elements in the form of pins with corresponding recesses are provided on the contacting surfaces and engage into one another in the final position shown in FIG. 7.

In an alternative embodiment that is not illustrated in the drawings, the articulated connection can also be arranged on the upper side of the traverse 9. In this case, the corresponding coupling of the articulated connection to the lateral parts 2, 8 is realized at the contact point between the right upper edge of the traverse 9 shown in FIG. 7 and the lateral parts 2, 8. In order to facilitate lifting, the lateral parts are placed on the floor with the side that points upward in FIG. 1 such that the traveling legs 5, 5' lie on the floor with the rollers 6, 6' on the right in FIG. 1 and the upper ends of the lateral parts 2, 8 rest on a support platform on the left. The traverse 9 is then moved toward the upper ends of the lateral parts 2, 8 by means of the forklift 1 from the left in reference to the drawings and is connected thereto by means of the articulated connection. After slightly lifting the traverse 9 with the lifting fork 13, the support platform is removed and the traverse 9 is subsequently lifted into the final position. This causes the lateral parts 2, 8 to turn into their upright final position as described above. The advantage of this embodiment can be seen in that the rollers 6 provided to the traveling legs 5, 5' can be used instead of the rollers on the tipping edge 15. Furthermore, the rollers 6 can already be placed on the rails of the rail arrangement such that the lateral parts 2, 8 are guided into the final position when the rollover wash unit is transferred into the upright position.

If the traverse 9 should be arranged on the right side of the lateral parts 2, 8 instead of the left side in FIG. 7, the traverse 9 is placed on the floor 3 to the right of the lateral parts 2, 8 in FIG. 1. In this position, the articulated connection is produced on the upper side of the traverse 9 and at the upper ends of the lateral parts 2, 8 as described above with reference to the alternative embodiment. The traverse 9 is lifted by means of the forklift 1 from the right in this case, wherein the lifting process essentially takes place as in the embodiment shown.

The invention claimed is:

1. A method for assembling a rollover wash unit comprising:
    placing a separated lateral support on opposing ends of a traverse, each lateral support defining a longitudinal axis extending through the longest dimension of the lateral support, the longitudinal axes of the two lateral supports positioned substantially relatively parallel,
    connecting the traverse to the lateral supports at an articulated connection between the traverse and each lateral support, the articulated connection permitting the traverse to rotate about a rotational axis extending substantially perpendicular to the longitudinal axis of the lateral support, the assembled traverse and lateral supports forming thereby an assembly position,
    raising the traverse and connected lateral supports from the assembly position into a final position, the lateral supports rotate about the rotational axis with respect to the traverse during the raising, and
    rigidly securing the traverse to the lateral parts in the final position, thereby preventing the lateral supports from further rotating about the rotational axis.

2. The method according to claim 1, wherein the lateral supports are lain on a surface.

3. The method according to claim 1, wherein the lateral supports stand substantially upright in the final position.

4. The method according to claim 1, wherein the traverse rotates about the rotational axis, to remain at a substantially constant angular disposition relative to the surface, during the raising step.

5. The method according to claim 1, wherein the lateral supports move along the surface upon rollers during the raising step.

6. The method according to claim 2, wherein the lateral parts stand substantially upright in the final position.

7. The method according to claim 1 wherein the traverse is not rotated relative to the surface during raising of the traverse to the final position.

8. The method according to claim 1, wherein the lateral parts are rotated relative to the traverse during raising of the traverse to the final position, the lateral supports contacting the surface upon traveling legs that are provided with a rolling element.

9. A method for assembling a rollover wash unit on a surface comprising:
    arranging a traverse between two separated lateral supports, each lateral support defining a longitudinal axis extending through the longest dimension of the lateral support, the longitudinal axes of the two lateral supports positioned substantially relatively parallel;
    providing an articulated connection between each lateral support and the traverse at an assembly position, the articulated connection permitting the traverse to rotate about a rotational axis relative to the lateral supports and extending substantially perpendicular to the longitudinal axes of the supports; and
    transferring the traverse from the assembly position to a final position while securing the traverse so as to maintain a plane of the traverse in a substantially constant orientation with respect to the surface, the lateral supports thereby rotating about the rotational axis with respect to the traverse during the transferring.

* * * * *